United States Patent
Mu et al.

(10) Patent No.: US 12,488,905 B2
(45) Date of Patent: Dec. 2, 2025

(54) WASTE LIQUID RECOVERY SYSTEM FOR LARGE STORAGE TANK

(71) Applicant: China National Nuclear Corporation Sichuan Environmental Protection Engineering Co., Ltd., Guangyuan (CN)

(72) Inventors: Kunlin Mu, Guangyuan (CN); Fei Li, Guangyuan (CN); Changsheng He, Guangyuan (CN); Zhouyang Jiang, Guangyuan (CN); Hao Fan, Guangyuan (CN); Qizhao Ma, Guangyuan (CN); Bingzhi Wang, Guangyuan (CN); Tao Wang, Guangyuan (CN); Ya Zhou, Guangyuan (CN); Kai Xie, Guangyuan (CN); Guangming Dai, Guangyuan (CN); Xiaoqiang Li, Guangyuan (CN); Yu Liu, Guangyuan (CN); Chao Yang, Guangyuan (CN); Li Li, Guangyuan (CN); Shaohan Hou, Guangyuan (CN)

(*) Notice: Subject to any disclaimer, the term of this patent is extended or adjusted under 35 U.S.C. 154(b) by 0 days.

(21) Appl. No.: 18/885,182

(22) Filed: Sep. 13, 2024

(65) Prior Publication Data

US 2025/0191798 A1 Jun. 12, 2025

(30) Foreign Application Priority Data

Dec. 12, 2023 (CN) .......................... 202311705981.5

(51) Int. Cl.
*G21F 9/00* (2006.01)
*G21F 9/02* (2006.01)
*G21F 9/06* (2006.01)

(52) U.S. Cl.
CPC ................ *G21F 9/001* (2013.01); *G21F 9/02* (2013.01); *G21F 9/06* (2013.01)

(58) Field of Classification Search
CPC ............... G21F 9/001; G21F 9/02; G21F 9/06
See application file for complete search history.

(56) References Cited

U.S. PATENT DOCUMENTS

| | | | | |
|---|---|---|---|---|
| 5,160,636 A | * | 11/1992 | Gilles | ....................... C02F 1/26 |
| | | | | 210/806 |
| 2016/0045841 A1 | * | 2/2016 | Kaplan | ................. C01B 17/027 |
| | | | | 429/49 |

FOREIGN PATENT DOCUMENTS

| CN | 117717799 A | 3/2024 |
|---|---|---|
| CN | 117923732 A | 4/2024 |

* cited by examiner

Primary Examiner — P. Macade Nichols

(57) ABSTRACT

The present invention discloses a waste liquid recovery system for a large storage tank, and relates to the technical field of retirements of radioactive storage tanks. The present invention includes a control terminal, a transition tank, a water storage tank, a water-ring vacuum pump, a water mist separator, a high-pressure water spray apparatus, a solid waste collecting and weighing apparatus, and a sewage pump, where the transition tank and storage tank is connected with two ends of a recovery pipeline respectively; the water storage tank is provided with a ventilation valve, a solid-liquid separator, and a rotary stirring apparatus; the transition tank is connected to an inlet port of the solid-liquid separator; and a waste water outlet port of the water storage tank is connected with the sewage pump. According to the present invention, solid-liquid separation, a simple structure and a high automation degree are achieved.

2 Claims, 2 Drawing Sheets

WASTE LIQUID RECOVERY SYSTEM FOR LARGE STORAGE TANK

CROSS-REFERENCE TO RELATED APPLICATIONS

The present application claims priority to Chinese Patent Application No. 2023117059815, filed on Dec. 12, 2023, the entire disclosure of which is incorporated herein by reference.

TECHNICAL FIELD

The present invention relates to the technical field of retirement treatment of radioactive storage tanks, and specifically relates to a waste liquid recovery system for a large storage tank.

BACKGROUND

In a retirement process of a radioactive storage tank, a high radioactive dose rate level of the storage tank is caused due to residual radioactive substances at the bottom and the side walls of the storage tank, therefore, high-pressure water is utilized for cleaning and decontaminating the radioactive substances at the bottom and the side walls in the retirement process of the storage tank, and a large amount of cleaning waste water is generated in the implementation process.

At present, a sewage pump is commonly adopted for carrying out waste water emptying on the cleaning waste water in the storage tank, however, due to a limitation on structure dimensions of the sewage pump, the waste water in the storage tank cannot be completely emptied, and moreover, part of sediment and falling rust-proof paints are contained in the storage tank, and a pipeline is easily blocked by the large-particle sediment carried in the recovered waste liquid, so that a failure or damage of a device is caused.

SUMMARY

The present invention aims to provide a waste liquid recovery system for a large storage tank, and the waste liquid recovery system for the large storage tank can solve the above problems.

In order to solve the above problems, the technical solution adopted by the present invention is as follows:
the present invention provides a waste liquid recovery system for a large storage tank, and the waste liquid recovery system for the large storage tank includes a control terminal, a transition tank, a water storage tank, a water-ring vacuum pump, a water mist separator, a high-pressure water spray apparatus, a solid waste collecting and weighing apparatus, and a sewage pump, where
a water mist inlet port of the water mist separator is connected with a negative-pressure suction port of the transition tank, a liquid outlet port of the water mist separator is connected to a liquid return port located below the negative-pressure suction port, of the transition tank, and a suction port of the water-ring vacuum pump is connected to an exhaust port of the water mist separator, and used for enabling the transition tank to generate a negative pressure;
a waste liquid recovery port of the transition tank is connected with one end of a recovery pipeline, and the other end of the recovery pipeline is used for being arranged at the lowest point of waste water collection in the radioactive storage tank;
the water storage tank is provided with a ventilation valve, a solid-liquid separator, and a rotary stirring apparatus, the solid-liquid separator is arranged at an upper part in the water storage tank, the rotary stirring apparatus is arranged at the bottom in the water storage tank, and the ventilation valve is arranged above the water storage tank and communicates with the water storage tank;
the transition tank is located above the water storage tank, and connected to an inlet port of the solid-liquid separator through a pipeline with a switching valve; a liquid drainage port of the solid-liquid separator is connected into the water storage tank, a solid waste discharge port of the solid-liquid separator is connected to the solid waste collecting and weighing apparatus, and a high-pressure water spray head of the high-pressure water spray apparatus faces the bottom in the water storage tank;
a waste water outlet port of the water storage tank is connected with the sewage pump through a pipeline with a sewage valve; and
the sewage pump, the sewage valve, the solid waste collecting and weighing apparatus, the high-pressure water spray apparatus, the solid-liquid separator, the rotary stirring apparatus, the ventilation valve, the switching valve, the water-ring vacuum pump and the water mist separator are all electrically connected with the control terminal.

In a preferred implementation manner of the present invention, a connection pipeline between the liquid outlet port of the water mist separator and the transition tank is provided with an emptying valve, and the emptying valve is electrically connected with the control terminal.

In a preferred implementation manner of the present invention, the water storage tank is provided with a first liquid level gauge which is electrically connected with the control terminal, and the first liquid level gauge is used for monitoring a liquid level in the water storage tank.

In a preferred implementation manner of the present invention, the transition tank is provided with a second liquid level gauge which is electrically connected with the control terminal, and the second liquid level gauge is used for monitoring a liquid level in the transition tank.

In a preferred implementation manner of the present invention, an outlet port of the sewage pump is connected to a liquid waste collection box, the liquid waste collection box is provided with a third liquid level gauge which is electrically connected with the control terminal, and the third liquid level gauge is used for monitoring a liquid level in the liquid waste collection box.

In a preferred implementation manner of the present invention, the high-pressure water spray apparatus includes a pipeline with a production water inlet valve, one end of the pipeline is used for introducing production water, and the other end of the pipeline is connected with the high-pressure water spray head; and the production water inlet valve is electrically connected with the control terminal.

In a preferred implementation manner of the present invention, the solid waste collecting and weighing apparatus includes a weight detector and a solid waste collection box placed on the weight detector, the weight detector is electrically connected with the control terminal, and a solid waste discharge port of the solid-liquid separator is connected to the solid waste collection box.

In a preferred implementation manner of the present invention, a flow meter is arranged at an outlet side of the sewage pump, a mud concentration detector is arranged in the water storage tank, and the mud concentration detector and the flow meter are electrically connected with the control terminal.

Compared with the prior art, the beneficial effects of the present invention are as follows:

1) a waste liquid in the radioactive storage tank may be pumped out to the recovery system through the recovery pipeline, so that convenient and efficient recovery is achieved;

2) waste water and sediment in the radioactive storage tank can be completely recovered, the waste water in the radioactive storage tank can be completely emptied, and solid-liquid separation can be carried out on solid impurities such as the sediment and paints, and the waste liquid, so that solid wastes and liquid wastes are collected and stored in a classified manner, and then the condition that the pipeline is easily blocked by the large-particle sediment carried in the recovered waste liquid, so that a failure of a device is caused, is avoided; and 3) automatic control may be realized through an information acquisition device and the control terminal, and a simple structure and a high automation degree are achieved.

In order to make the above objectives, features, and advantages of the present invention more obvious and understandable, the examples of the present invention are specifically provided below, and described in detail below in combination with the accompanying drawings.

BRIEF DESCRIPTION OF DRAWINGS

In order to describe the technical solutions of the examples of the present invention more clearly, the drawings required to be used in the examples will be introduced briefly below, it should be understood that, the following drawings show only some examples of the present invention and therefore should not be regarded as a limitation on the scope, and other relevant drawings may also be derived according to these drawings by those of ordinary skill in the art without any creative efforts.

Figure 1:
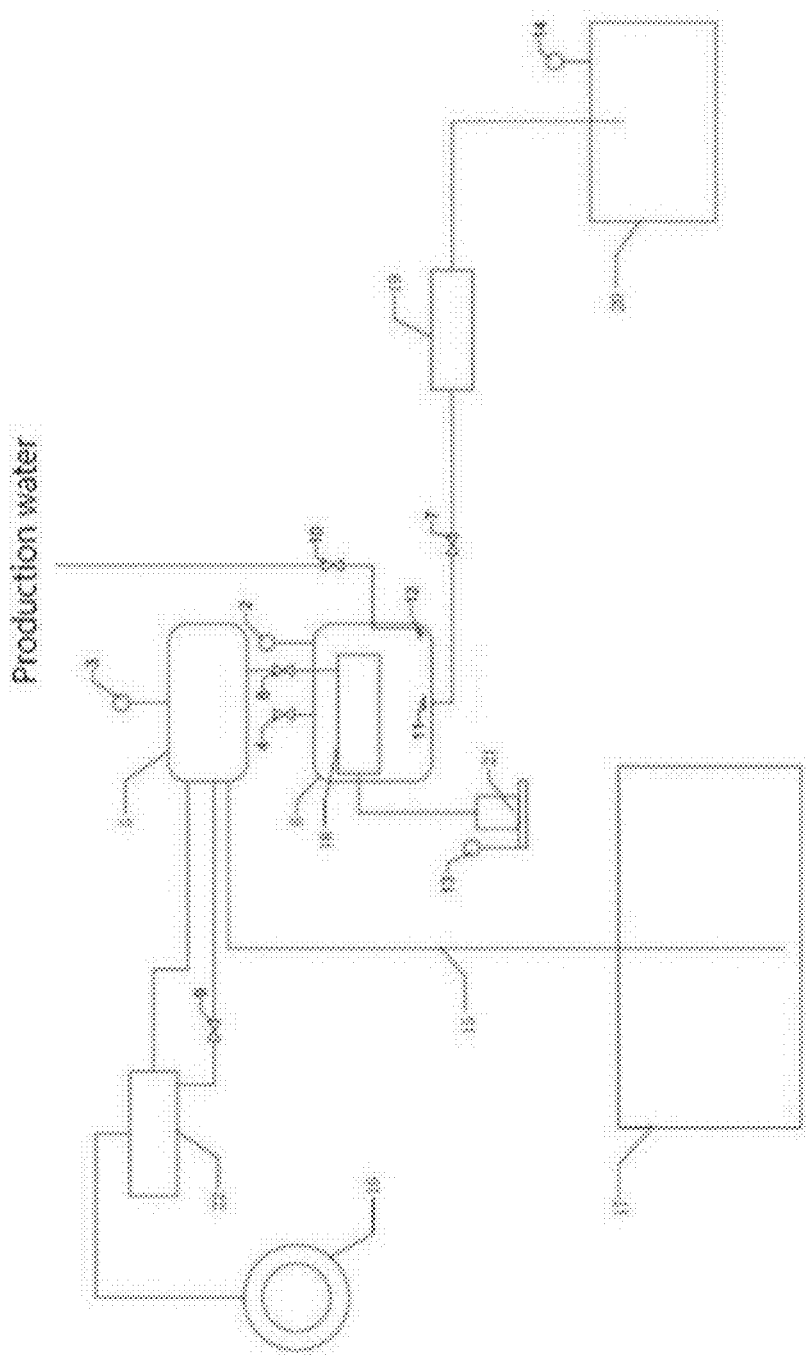
FIG. 1 is a schematic diagram of a flow of carrying out cleaning waste water recovery and drainage working by a waste liquid recovery system for a large storage tank in an example of the present invention.

In the drawings: 1. waste liquid recovery port; 2. first liquid level gauge; 3. second liquid level gauge; 4. ventilation valve; 5. transition tank; 6. water storage tank; 7. sewage valve; 8. switching valve; 9. emptying valve; 10. production water inlet valve; 11. rotary stirring apparatus; 12. high-pressure water spray head; 13. weight detector; 14. third liquid level gauge; 15. recovery pipeline; 16. water-ring vacuum pump; 17. radioactive storage tank; 18. solid-liquid separator; 19. sewage pump; 20. liquid waste collection box; 21. solid waste collection box; 22. water mist separator.

DETAILED DESCRIPTION OF THE EMBODIMENTS

In order to make the objectives, technical solutions and advantages of the examples of the present invention clearer, the technical solutions in the examples of the present invention will be clearly and completely described below in combination with the drawings in the examples of the present invention, and apparently, the described examples are some but not all of the examples of the present invention.

Figure 2:
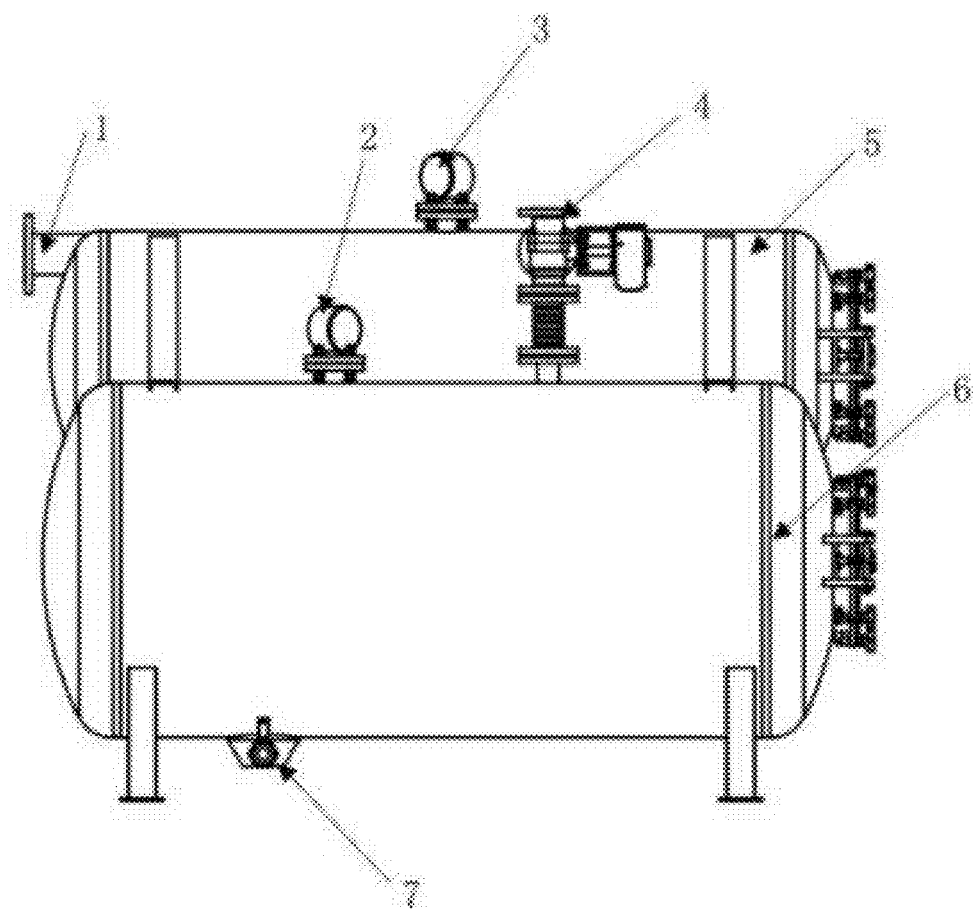
FIG. 2 is a physical diagram of assembling for a transition tank and a water storage tank in the example of the present invention.

Referring to FIG. 1 and FIG. 2, the example of the present invention provides a waste liquid recovery system for a large storage tank, and the waste liquid recovery system for the large storage tank includes a control terminal (not shown in the drawings), a transition tank 5, a water storage tank 6, a water-ring vacuum pump 16, a water mist separator 22, a high-pressure water spray apparatus, a solid waste collecting and weighing apparatus, and a sewage pump 19, where a water mist inlet port of the water mist separator 22 is connected with a negative-pressure suction port of the transition tank 5, a liquid outlet port of the water mist separator 22 is connected to a liquid return port located below the negative-pressure suction port, of the transition tank 5, and a suction port of the water-ring vacuum pump 16 is connected to an exhaust port of the water mist separator 22, and used for enabling the transition tank to generate a negative pressure; a waste liquid recovery port 1 of the transition tank 5 is connected with one end of a recovery pipeline 15, and the other end of the recovery pipeline 15 is used for being arranged at the lowest point of waste water collection in the radioactive storage tank 17; the water storage tank 6 is provided with a ventilation valve 4, a solid-liquid separator 18, and a rotary stirring apparatus 11, the solid-liquid separator 18 is arranged at an upper part in the water storage tank 6, the rotary stirring apparatus 11 is arranged at the bottom in the water storage tank 6, and the ventilation valve 4 is arranged above the water storage tank 6 and communicates with the water storage tank 6; the transition tank 5 is located above the water storage tank 6, and connected to an inlet port of the solid-liquid separator 18 through a pipeline with a switching valve 8; a liquid drainage port of the solid-liquid separator 18 is connected into the water storage tank 6, a solid waste discharge port of the solid-liquid separator 18 is connected to the solid waste collecting and weighing apparatus, and a high-pressure water spray head 12 of the high-pressure water spray apparatus faces the bottom in the water storage tank 6; and a waste water outlet port of the water storage tank 6 is connected with the sewage pump 19 through a pipeline with a sewage valve 7.

A connection pipeline between the liquid outlet port of the water mist separator 22 and the transition tank 5 is provided with an emptying valve 9. The water storage tank 6 is provided with a first liquid level gauge 2 which is used for monitoring a liquid level in the water storage tank 6. The transition tank 5 is provided with a second liquid level gauge 3 which is used for monitoring a liquid level in the transition tank 5. An outlet port of the sewage pump 19 is connected to a liquid waste collection box 20, and the liquid waste collection box 20 is provided with a third liquid level gauge 14 which is used for monitoring a liquid level in the liquid waste collection box 20.

The high-pressure water spray apparatus includes a pipeline with a production water inlet valve 10, one end of the pipeline is used for introducing production water, and the other end of the pipeline is connected with the high-pressure water spray head 12.

The solid waste collecting and weighing apparatus includes a weight detector 13 and a solid waste collection box 21 placed on the weight detector 13, and a solid waste discharge port of the solid-liquid separator 18 is connected to the solid waste collection box 21.

A flow meter (not shown in the drawings) is arranged at an outlet side of the sewage pump 19, and a mud concentration detector (not shown in the drawings) is arranged in the water storage tank 6.

The sewage pump 19, the sewage valve 7, the solid waste collecting and weighing apparatus, the high-pressure water spray apparatus, the solid-liquid separator 18, the rotary stirring apparatus 11, the ventilation valve 4, the switching valve 8, the water-ring vacuum pump 16, the water mist separator 22, the emptying valve 9, the first liquid level gauge 2, the second liquid level gauge 3, the third liquid level gauge 14, the production water inlet valve 10, the weight detector 13, the mud concentration detector, and the flow meter are all electrically connected with the control terminal.

A working method of the waste liquid recovery system for the large storage tank in the example of the present invention is as follows:

1) one end of the recovery pipeline 15 for cleaning waste water is arranged in the radioactive storage tank 17, located at the lowest point of waste water collection in the radioactive storage tank 17, and used for recovery for the cleaning waste water, and the recovery pipeline 15 is connected with the transition tank 5;

2) before the system is run, the switching valve 8 and the emptying valve 9 at the liquid outlet port of the water mist separator 22 are opened at first, the other valves are all in a closed state, at this moment, the water-ring vacuum pump 16 is started, a waste liquid is sucked into the transition tank 5 by virtue of the negative pressure generated by the water-ring vacuum pump 16, since the switching valve 8 is in an open state, the transition tank 5 and the water storage tank 6 are in a communication state, and the waste liquid flows into the water storage tank 6 from the transition tank 5 under the action of gravity;

3) the waste liquid flowing into the water storage tank 6 enters the solid-liquid separator 18 at the upper part in the water storage tank 6 at first, solid-liquid separation is carried out on various substances in the waste liquid through the solid-liquid separator 18, the separated solid particles are discharged to the solid waste collection box 21 outside the water storage tank 6, the separated fluid flows to a place below the solid-liquid separator 18 in the water storage tank 6, and the first liquid level gauge 2 monitors the condition of the liquid level in the tank in real time, and transmits a signal to the control terminal;

when the first liquid level gauge 2 monitors that the liquid level in the water storage tank 6 reaches a high liquid level set by a user, the control terminal sends an instruction, the system closes the switching valve 8, opens the ventilation valve 4 and the sewage valve 7, and starts the rotary stirring apparatus 11 and the sewage pump 19, and the fluid at the bottom of the water storage tank 6 is pumped out to the liquid waste collection box 20; and when the first liquid level gauge 2 monitors that the waste liquid discharge from the water storage tank 6 reaches a low liquid level set by the user, the control terminal sends an instruction, the system turns off the sewage pump 19 and the rotary stirring apparatus 11, closes the sewage valve 7 and the ventilation valve 4, and opens the switching valve 8, and the waste liquid may then flow into the water storage tank 6 from the interior of the transition tank 5 again;

4) when the mud concentration detector monitors a high concentration of mud at the bottom in the water storage tank 6, and the flow meter detects a low discharge flow rate of the waste liquid of the sewage pump 19, it is considered that the mud concentration is high, so that difficult water drainage is caused, at this moment, the control terminal sends an instruction to close the sewage valve 7, turn off the sewage pump 19, open the production water inlet valve 10, and turn on the rotary stirring apparatus 11, the production water impacts the high-concentration mud at the bottom of the water storage tank 6 through the high-pressure water spray head 12, and reduces the mud concentration in cooperation with mixing and stirring of the rotary stirring apparatus 11, when the mud concentration detector monitors that the concentration of the mud at the bottom in the water storage tank 6 is reduced to a set value of the user, the control terminal sends an instruction to open the sewage valve 7 and turn on the sewage pump 19, and at this moment, the diluted mud is discharged through the sewage pump 19;

5) the transition tank 5 is provided with the second liquid level gauge 3 for monitoring the liquid level in the transition tank 5 in real time, when the switching valve 8 is closed, the waste liquid is temporarily collected in the transition tank 5, when the liquid level in the transition tank 5 reaches a set high liquid level, the control terminal sends an instruction to turn off the water-ring vacuum pump 16, so that the transition tank 5 is not maintained in a negative-pressure state any more, the recovery for the waste liquid from the interior of the radioactive storage tank 17 is not continued, and then a too high liquid level in the transition tank 5 is avoided; and 6) the weight detector 13 monitors weight data of the solid wastes in the solid waste collection box 21 in real time, and timely transmits the weight data to the control terminal, when the weight of the solid wastes reaches a set value, the control terminal sends an alarming message, and the user may replace the next solid waste collection box 21.

The above description is only a preferred example of the present invention and is not used for limiting the present invention, and for those skilled in the art, the present invention may have various modifications and variations. Any modifications, equivalent substitutions, improvements, etc. made within the spirit and principles of the present invention should be included in the protection scope of the present invention.

What is claimed is:

1. A waste liquid recovery system for a large storage tank, comprising a control terminal, a transition tank, a water storage tank, a water-ring vacuum pump, a water mist separator, a high-pressure water spray apparatus, a solid waste collecting and weighing apparatus, and a sewage pump, wherein a water mist inlet port of the water mist separator is connected with a negative-pressure suction port of the transition tank, a liquid outlet port of the water mist separator is connected to a liquid return port located below the negative-pressure suction port, of the transition tank, and a suction port of the water-ring vacuum pump is connected to an exhaust port of the water mist separator, and used for enabling the transition tank to generate a negative pressure;

a waste liquid recovery port of the transition tank is connected with one end of a recovery pipeline, and the other end of the recovery pipeline is used for being arranged at the lowest point of waste water collection in the radioactive storage tank;

the water storage tank is provided with a ventilation valve, a solid-liquid separator, and a rotary stirring apparatus, the solid-liquid separator is arranged at an upper part in the water storage tank, the rotary stirring apparatus is arranged at the bottom in the water storage tank, and the ventilation valve is arranged above the water storage tank and communicates with the water storage tank;

the transition tank is located above the water storage tank, and connected to an inlet port of the solid-liquid separator through a pipeline with a switching valve; a liquid drainage port of the solid-liquid separator is connected into the water storage tank, a solid waste discharge port of the solid-liquid separator is connected to the solid waste collecting and weighing apparatus, and a high-pressure water spray head of the high-pressure water spray apparatus faces the bottom in the water storage tank;

a waste water outlet port of the water storage tank is connected with the sewage pump through a pipeline with a sewage valve;

the sewage pump, the sewage valve, the solid waste collecting and weighing apparatus, the high-pressure water spray apparatus, the solid-liquid separator, the rotary stirring apparatus, the ventilation valve, the switching valve, the water-ring vacuum pump and the water mist separator are all electrically connected with the control terminal;

a connection pipeline between the liquid outlet port of the water mist separator and the transition tank is provided with an emptying valve, and the emptying valve is electrically connected with the control terminal;

the water storage tank is provided with a first liquid level gauge which is electrically connected with the control terminal, and the first liquid level gauge (2) is used for monitoring a liquid level in the water storage tank;

the transition tank is provided with a second liquid level gauge which is electrically connected with the control terminal, and the second liquid level gauge is used for monitoring a liquid level in the transition tank;

an outlet port of the sewage pump is connected to a liquid waste collection box, the liquid waste collection box is provided with a third liquid level gauge which is electrically connected with the control terminal, and the third liquid level gauge is used for monitoring a liquid level in the liquid waste collection box;

the solid waste collecting and weighing apparatus comprises a weight detector and a solid waste collection box placed on the weight detector, the weight detector is electrically connected with the control terminal, and a solid waste discharge port of the solid-liquid separator is connected to the solid waste collection box; and a flow meter is arranged at an outlet side of the sewage pump, a mud concentration detector is arranged in the water storage tank, and the mud concentration detector and the flow meter are electrically connected with the control terminal.

2. The waste liquid recovery system for the large storage tank according to claim 1, wherein the high-pressure water spray apparatus comprises a pipeline with a production water inlet valve, one end of the pipeline is used for introducing production water, and the other end of the pipeline is connected with the high-pressure water spray head; and the production water inlet valve is electrically connected with the control terminal.

* * * * *